ns Patent [19]

Grew et al.

[11] 3,853,883
[45] Dec. 10, 1974

[54] PROCESS FOR THE PRODUCTION OF DIHYDROCODEINE

[75] Inventors: Edward Leon Grew; Alastair Agnew Robertson, both of Edinburgh, Scotland

[73] Assignee: MacFarlan Smith Limited, Edinburgh, Scotland

[22] Filed: Feb. 22, 1972

[21] Appl. No.: 228,357

[30] Foreign Application Priority Data
Aug. 27, 1971  Great Britain ................... 40245/71

[52] U.S. Cl. .............................................. 260/285
[51] Int. Cl. ............................................ C07d 43/28
[58] Field of Search .................................... 260/285

[56] References Cited
UNITED STATES PATENTS
2,290,332  6/1961  Keating .............................. 260/285

3,166,559  1/1965  Sawa ................................... 260/285
3,221,008  11/1965  Wolf .................................... 260/285
3,256,286  6/1966  Sawa ................................... 260/285
3,257,406  6/1966  Sawa ................................... 260/285

FOREIGN PATENTS OR APPLICATIONS
417,787  4/1966  Japan .................................. 260/285
4,210,366  5/1960  Japan .................................. 260/285

Primary Examiner—Donald G. Daus
Attorney, Agent, or Firm—Bacon & Thomas

[57]  ABSTRACT

A process for the preparation of 1-dihydrocodeine which comprises catalytically hydrogenating 1-dihydrocodeinone in a liquid medium in the presence of a base using a catalyst selected from the group consisting of platinum oxide and supported platinum metal, removing the catalyst, separating the base from the liquid medium and recovering 1-dihydrocodeine therefrom.

8 Claims, No Drawings

PROCESS FOR THE PRODUCTION OF DIHYDROCODEINE

This invention relates to an improved process for the catalytic hydrogenation of 1-dihydrocodeinone (1 = laevorotary) to yield 1-dihydrocodeine.

In U.S. application Ser. No. 228,367, entitled "Manufacture of 1-Dihydrocodeine," filed by one of us and David J. Pawles on Feb. 22, 1972, there is disclosed a process for the preparation of a purified 1-dihydrocodeine suitable for pharmaceutical use which comprises catalytically hydrogenating 1-dihydrocodeinone in a liquid medium using a platinum oxide or supported platinum metal catalyst, removing said catalyst, treating the resulting solution for removal of 1-dihydrothebainone and/or 1-dihydrothebainol by either (1) isolating the crude 1-dihydrocodeine from said solution, dissolving said crude 1-dihydrocodeine in a water-immiscible solvent and extracting the solution with aqueous alkali or (2) passing said solution through an anion exchange resin of a quaternary ammonium type in the hydroxide form; and recovering a purified 1-dihydrocodeine, if desired, in salt form.

We have now found that the rate of hydrogenation of 1-dihydrocodeinone in a liquid medium using a platinum oxide or supported platinum metal catalyst can be substantially increased by the addition of a small amount of base. Furthermore, it can be shown by gas-liquid chromatography that the composition of the reaction mixture is similar to that obtained by such catalytic hydrogenation in the absence of base. In particular, the proportions of the impurities 1-dihydrothebainol, 1-dihydrothebainone and 1-dihydroisocodeine, are essentially unchanged.

By the term "liquid medium" as used herein, we mean a liquid in which 1-dihydrocodeinone has an appreciable solubility. Typical of such liquid media are the lower alkanols, and in particular, ethyl alcohol, especially in its commercially available form of industrial methylated spirit.

We have found that it is preferable to use an alkali metal hydroxide or an alkali metal alkoxide or a quaternary ammonium hydroxide as the base, for example sodium hydroxide, sodium ethoxide or tetramethylammonium hydroxide.

Although there is no upper limit on the amount of base which may be used, the optimum results are usually obtained with amounts of base in the range 0.1 to 4%, based on the weight of 1-dihydrocodeinone. The precise ratio of base to 1-dihydrocodeinone required is related to the quantity and type of catalyst used and the optimum amount for a particular process can readily be determined by preliminary experiment.

It has also been found that the stage at which the base should be added to the reaction mixture is to a certain extent dependent on the catalyst used. Hence, in the case of a platinum oxide catalyst it is desirable to delay the addition of base until reduction of the oxide catalyst to the metal is complete and hydrogenation has begun. However, in the case of a supported platinum metal catalyst, the base may be added at the initial stage of the reaction.

By using the selected amount of base, it is possible to reduce the time required (by up to 75%) to effect complete hydrogenation of 1-dihydrocodeinone when compared to hydrogenation with the same amount of catalyst but in the absence of base. Alternatively, it is possible to reduce the quantity of catalyst (by up to 90%) required to complete the hydrogenation in a given time when compared to the quantity of catalyst required in the absence of base. The commercial advantages of such time or catalyst reductions are obviously extremely desirable.

After hydrogenation of the 1-dihydrocodeinone, it is necessary to remove the various impurities from the reaction mixture. In the process described in the aforementioned application, after removal of the catalyst from the reaction mixture, the phenolic impurities may be removed by passing the mixture through a column of an anion exchange resin of a quaternary ammonium type in the hydroxide form. However, before such a process can be adopted to purify the reaction mixture resulting from the process of the present invention, it is necessary to remove the base from the solution. If the base were not removed, it would interfere with the adsorption mechanism of the ion exchange column and furthermore pass unaffected through the column and so complicate the subsequent isolation of the 1-dihydrocodeine as a salt.

It is possible to isolate the base from the hydrogenation solution before treatment on the anion exchange resin by evaporating the solution to dryness (preferably under reduced pressure), adding water to dissolve the base and then extracting the resultant aqueous mixture with a water immiscible solvent such as benzene. The organic phase is then separated and evaporated to dryness to produce a 1-dihydrocodeine residue, which may be dissolved in an alcohol yielding a solution suitable for treatment on an anion exchange column.

However, our preferred method of removing the base from the hydrogenation solution is by treatment of the solution on a cation exchange resin in the hydrogen form. Since the 1-dihydrocodeine is a weaker base than the base used to promote the hydrogenation reaction, by carefully adjusting the amount of resin employed in the ion exchange column, such that there is only just sufficient to adsorb all the alkali metal or quaternary ammonium ions present, it is possible to ensure that virtually none of the 1-dihydrocodeine is retained on the resin.

The solution obtained after passage through the cation exchange resin column to remove the base as described above can be passed directly to an anion exchange resin column as described in the aforementioned application, to recover 1-dihydrocodeine in pharmaceutically pure form.

In a preferred embodiment of the invention it will be seen, therefore, that a multistage process for the production of 1-dihydrocodeine is provided comprising the steps of a. catalytically hydrogenating 1-dihydrocodeinone in a liquid medium in the presence of a base using a catalyst selected from the group consisting of platinum oxide and supported platinum metal,
b. removing the catalyst therefrom,
c. passing the solution through a cationic exchange resin in the hydrogen form to remove the base, or evaporating the solution to dryness, dissolving the residue in water, extracting the 1-dihydrocodeine with a water immiscible solvent, and separating the aqueous phase containing the base,
d. passing the solution of 1-dihydrocodeinone obtained in the previous step through an anionic exchange resin of a quaternary ammonium type in the hydroxide form, and e. recovering a purified dihydrocodeine therefrom.

The following Examples illustrate the invention.

EXAMPLE 1

The experiments described below serve to demonstrate the promoting effect of a base on the catalytic hydrogenation of 1-dihydrocodeinone using platinum oxide or a supported platinum metal catalyst. All the experiments were carried out at atmospheric pressure and ambient temperature, the same rate of (magnetic) stirring being employed in each case. The same quantity of 1-dihydrocodeinone (3.0 g) taken from a single batch of the material, and the same amount of solvent (50 ml of 95% industrial methylated spirit) were used in all the experiments.

A. The 1-dihydrocodeinone and the solvent were stirred under hydrogen with 100 mg of platinum oxide catalyst until the latter had been reduced to the metal. 0.5 ml of 1N sodium hydroxide solution in 95% industrial methylated spirit was then introduced into the reaction flask and the hydrogenation continued. The rate of uptake of hydrogen following the addition of the sodium hydroxide remained constant over almost the whole course of the reduction, decreasing rapidly to zero as the point corresponding to the absorption of the theoretical volume of hydrogen was approached. The total time required for the complete hydrogenation of the 1-dihydrocodeinone, including the time taken to reduce the catalyst, was 55 minutes.

B. Conditions as in (A) but omitting the addition of sodium hydroxide solution. Hydrogenation was very much slower than in (A) and the rate of uptake of hydrogen decreased progressively as the reduction proceeded. Absorption of hydrogen was still not complete after the hydrogenation had been in progress for a period of 260 minutes.

C. Conditions as for (A) but adding the sodium hydroxide solution at the start of the reduction together with the 1-dihydrocodeinone and the platinum oxide catalyst. There was a long period of induction (about 3 hours) before uptake of hydrogen commenced.

D. 100 mg of platinum oxide catalyst was stirred with the solvent under hydrogen until the catalyst had been reduced to the metal (ca. 10 minutes). The 1-dihydrocodeinone was then introduced into the reaction flask together with 0.5 ml of 1N sodium hydroxide solution in 95% industrial methylated spirit, and the hydrogenation continued until absorption of hydrogen ceased. The rate of uptake of the gas remained constant over almost the whole course of the reduction as in (A), and hydrogenation was complete after 50 minutes (including the time required for the reduction of the catalyst), i.e., in about the same time as in experiment (A).

E. Conditions as for (A) but using only 0.3 ml of the normal sodium hydroxide solution. The rate of hydrogen uptake remained constant over almost the whole course of the reduction, which was completed in 55 minutes, i.e. in about the same time as in experiments (A) and (D).

F. Conditions as for (A) but using 0.2 ml of the normal solution of sodium hydroxide. The rate of hydrogen uptake remained constant until about two-thirds of the calculated amount of hydrogen had been absorbed, but thereafter decreased rapidly and hydrogenation was still not complete after a period of 130 minutes.

Experiments (A) to (F) show that for the particular conditions specified the maximum promoting effect of sodium hydroxide on the hydrogenation is obtained with about 0.3 ml of a normal solution of the reagent (equivalent to 0.4% by weight of sodium hydroxide on the dihydrocodeinone) and that no advantage is gained by using more than this amount.

G. Conditions as for (A) but using only 10 mg of platinum oxide instead of 100 mg. Reduction was slower than in experiment (A) but was complete in 150 minutes. Comparison of this result with that obtained in (B) shows that the rate of hydrogenation of dihydrocodeinone with 10 mg of platinum oxide catalyst in the presence of sodium hydroxide is considerably more rapid than with 10 times this amount of catalyst in the absence of sodium hydroxide. GLC showed that the composition of the product obtained was not affected by the use of the reduced amount of catalyst.

H. The 1-dihydrocodeinone and the solvent were mixed with 2.0 g of 5% platinum on carbon catalyst (containing 100 mg of platinum metal), and 2.5 ml of 1N sodium hydroxide solution in 95% industrial methylated spirit. The mixture was stirred under hydrogen until absorption of gas ceased. The total time required to complete the hydrogenation was 20 minutes.

J. As for (H) but omitting the addition of the sodium hydroxide solution. Hydrogenation proceeded very much more slowly than in experiment (H) and was still incomplete after 180 minutes.

K. As for (H) but using only 200 mg of 5% platinum on carbon catalyst and 0.5 ml of 1N sodium hydroxide solution in 95% industrial methylated spirit. Hydrogenation was completed in 45 minutes. Comparison of this result with that obtained in experiment (J) shows that hydrogenation with 200 mg of 5% platinum on carbon catalyst in the presence of sodium hydroxide is considerably more rapid than with 10 times this amount of catalyst in the absence of sodium hydroxide. GLC showed that the composition of the product obtained was not significantly altered as a result of the greatly reduced amount of catalyst employed.

L. Conditions as for (B) but with the addition of 0.5 ml of 1N tetramethylammonium hydroxide solution, introduced after the catalyst had been reduced to the metal. The rate of hydrogen up-take was considerably increased and remained constant over the major part of the reaction. The reduction was completed in about 65 minutes.

Experiment (L) shows that replacement of sodium hydroxide as the base by a quaternary ammonium hydroxide gives similar results.

EXAMPLE 2

3.0 g of 1-dihydrocodeinone was stirred under hydrogen at atmospheric pressure and ambient temperature with 50 ml of n-butanol and 100 mg of platinum oxide catalyst. The rate of hydrogen uptake decreased progressively as the reduction proceeded but hydrogenation was complete after about 240 minutes.

The experiment was repeated with the addition of 2.0 ml of 0.25 N sodium hydroxide solution in n-butanol introduced after the platinum oxide had been reduced in the metal. The rate of hydrogen uptake was considerably increased and remained constant over the main part of the reaction. Reduction was complete after about 60 minutes.

EXAMPLE 3

The following experiments serve to demonstrate the ion exchange resin procedure for separating the sodium hydroxide from the 1-dihydrocodeine after the completion of the hydrogenation.

A solution of 175 g of 1-dihydrocodeine and 1.16 g of sodium hydroxide (0.66% by weight on the original 1-dihydrocodeinone) in 99.5% industrial methylated spirit was prepared and the solution passed down a one-inch diameter glass column containing Zeo-Karb 225 cation exchange resin in the hydrogen form. It was found that at a flow rate of about 25 ml per minute 80 g of the resin was just sufficient to adsorb all the sodium hydroxide present in the solution. Experiments also showed that under these conditions only insignificant amounts of 1-dihydrocodeine were retained on the resin column, the figure found in a series of six consecutive experiments ranging from 0.05% to 0.26% of the total quantity of 1-dihydrocodeine present in the solution.

The effectiveness of the above separation procedure from the point of view of the manufacture of 1-dihydrocodeine of pharmaceutical quality is shown by the fact that the ash content of the 1-dihydrocodeine tartrate isolated from the solution after resin treatment and addition of excess tartaric acid was negligible, whereas that of the 1-dihydrocodeine tartrate obtained from the untreated solution was far in excess of the maximum permissible figure specified for this product in the 1968 British Pharmacopoeia (1969 addendum).

EXAMPLE 4

The following experiments serve to demonstrate the manner in which the promoting effect of sodium hydroxide on the catalytic hydrogenation of 1-dihydrocodeinone illustrated in Example 1, and the cation exchange resin technique for the subsequent separation of the sodium hydroxide from the resulting dihydrocodeine illustrated in Example 3, can be conveniently combined with the procedure described in the aforementioned application for the removal of the phenolic impurities present in the hydrogenation solution by adsorption on an anion exchange resin of the quaternary ammonium type in the hydroxide form.

A slurry of 1 kg of 1-dihydrocodeinone, 5.0 g of platinum oxide and 2.0 litres of 99.5% industrial methylated spirit was charged into a 5-litre glass hydrogenation flask provided with a high speed turbine type stirrer, glass baffle, dropping funnel, and gas inlet tube reaching almost to the bottom of the flask to ensure that the hydrogen entered the vessel well below the surface of the reaction mixture.

The flask was evacuated and filled with hydrogen and the contents of the flask rapidly stirred under hydrogen at atmospheric pressure and room temperature until reduction of the platinum oxide to the metal was complete (as shown by the change in colour of the catalyst from brown to black), an operation which took about 40 minutes and during which 3 to 4 litres of hydrogen gas was absorbed. At this point, 330 ml of a 0.5 N solution of sodium hydroxide in 99.5% industrial methylated spirit was introduced into the flask as rapidly as possible and the hydrogenation continued, additional hydrogen being supplied from a reservoir as required to maintain the total pressure in the flask at atmospheric. The rate of uptake of hydrogen increased considerably following the addition of the sodium hydroxide and absorption of the gas was complete after about 5 hours, including the time required for the reduction of the catalyst. The total volume of hydrogen absorbed was about 80 litres.

Activated carbon powder (25 g) was then added to the hydrogenation mixture in the flask in order to assist in the separation of the catalyst, and the latter removed by filtration. The filtrate and washings from the filter were combined and passed through a one-inch diameter glass column containing 350 g of Zeo-Karb 225 cation exchange resin in the hydrogen form in order to remove the sodium ions present. The effluent from this column was then passed through a two-inch diameter glass column containing 2.0 kg of Deacidite FF quaternary ammonium type anion exchange resin in the hydroxide form, as described in the aforementioned application, in order to remove the phenolic impurities present in the solution.

The purified solution of 1-dihydrocodeine thus obtained, together with the washings from the columns, was treated with a small excess of solid tartaric acid, as described in the aforementioned application to give 1-dihydrocodeine tartrate in 93.5% yield referred to the original 1-dihydrocodeinone. The product applied with the specification of the 1968 British Pharmacopoeia (1969 addendum) in all respects. In particular the ash content of the material was negligible and the amount of phenolic impurities present (as measured by the morphine test) was well below the specified limit.

Other experiments have shown that if the same hydrogenation is carried out in the absence of sodium hydroxide the weight of platinum oxide catalyst employed must be increased by a factor of five to ten in order to achieve a comparable rate of hydrogenation.

EXAMPLE 5

23.375 kg of 1-dihydrocodeinone, 46 litres of 95% industrial methylated spirit and 116 g of platinum oxide catalyst were charged into a 150 litre capacity stainless steel hydrogenator fitted with turbine type impellor, cooling jacket, thermometer pocket, baffles, and gas inlet tube arranged so that hydrogen gas could be introduced well below the surface of the charge. The vessel was purged of air by evacuating and refilling several times with nitrogen, and the nitrogen then replaced with hydrogen at 15 lbs/sq.inch pressure. Stirring was started and the platinum oxide catalyst reduced to the metal. This was complete in about 30 minutes and was accompanied by a drop in pressure of about 7 lbs/sq.inch and a change in the colour of the reaction mixture from brown to black. The hydrogenator was then again purged with nitrogen and 7.6 litres of 0.5N sodium hydroxide solution in 95% industrial methylated spirit sucked into the reaction vessel. After refilling with hydrogen gas to 15 lbs/sq.inch pressure the hydrogenation was continued, the pressure being maintained at 10–15 lbs/sq.inch throughout the reaction. Uptake of hydrogen was rapid and the temperature rose spontaneously to 35°C and was maintained at approximately this level during the whole course of the reaction by occasional water cooling. Absorption of hydrogen was complete in about 2½ hours from the time at which the sodium hydroxide promoter was introduced.

The reaction mixture was cooled to room temperature, the catalyst separated by filtration, and the clear solution pumped through a column packed with 7–8 kgs of ZEO-KARB 225 SRC 13 cation exchange resin in the hydrogen form to remove sodium ions, and then through a second column containing 20–22 kgs of DEACIDITE FF SRA 65 anion exchange resin in the hydroxide form to adsorb the phenolic by-products formed in the reduction. After all the solution had been pumped through the columns the latter were washed with 30 litres of 95% industrial methylated spirit, and the combined effluent and washings treated with 12.5 kg of B.P. grade tartaric acid with stirring. 1-Dihydrocodeine bitartrate crystallised out and was isolated by filtration. After washing on the filter with 95% spirit and drying at 50°C the product obtained weighed 32.8 kg (93.5% of theory). It complied with the requirements of the 1968 British Pharmacopoeia (1969 addendum) specification for dihydrocodeine tartrate in all respects.

What is claimed is:

1. In a process for the preparation of 1-dihydrocodeine wherein 1-dihydrocodeinone is catalytically hydrogenated in a liquid medium with a catalyst selected from the group consisting of platinum oxide and supported platinum metal, the improvement which comprises the steps of:
   a. catalytically hydrogenating the 1-dihydrocodeinone in the presence of a base selected from the group consisting of alkali metal hydroxide, soluble alkali metal alkoxide and soluble quaternary ammonium hydroxide.

2. A process as claimed in claim 1 in which the alkali metal hydroxide is sodium hydroxide.

3. A process as claimed in claim 1 in which the alkali metal alkoxide is sodium ethoxide.

4. A process as claimed in claim 1 in which the quaternary ammonium hydroxide is tetramethylammonium hydroxide.

5. A process as claimed in claim 1 in which the base is present in an amount within the range of 0.1 to 4% by weight, based on the weight of 1-dihydrocodeinone.

6. A process as claimed in claim 1 in which the catalyst is added in the form of platinum oxide and in which the base is added at a stage in the reaction at which reduction of the platinum oxide to platinum metal has been completed and hydrogenation has just begun.

7. A process as claimed in claim 1 in which the catalyst is supported platinum metal and in which the base is added at an initial stage of the reaction.

8. In a process for the preparation of 1-dihydrocodeine wherein 1-dihydrocodeinone is catalytically hydrogenated in a liquid medium with a catalyst selected from the group consisting of platinum oxide and supported platinum, the improvement which comprises the steps of:
   a. catalytically hydrogenating the 1-dihydrocodeinone in the presence of a base selected from the group consisting of alkali metal hydroxide, soluble alkali metal alkoxide and soluble quaternary ammonium hydroxide;
   b. removing the catalyst;
   c. passing the solution through a cation exchange resin in the hydrogen form to remove the base;
   d. passing the solution of 1-dihydrocodeine obtained in step (c) through a quaternary ammonium anion exchange resin in hydroxide form; and
   e. recovering 1-dihydrocodeine.

* * * * *